US009589683B2

United States Patent
Fujimoto et al.

(10) Patent No.: US 9,589,683 B2
(45) Date of Patent: Mar. 7, 2017

(54) REACTOR SHUTDOWN SYSTEM

(75) Inventors: Hiroshi Fujimoto, Tokyo (JP);
Hironobu Shinohara, Tokyo (JP);
Yasutake Akizuki, Tokyo (JP); Toshiki Fukui, Tokyo (JP); Yuichi Tanaka, Tokyo (JP); Shinji Kiuchi, Tokyo (JP);
Hiroshi Shirasawa, Tokyo (JP);
Toshiaki Matsumura, Tokyo (JP)

(73) Assignees: MITSUBISHI HEAVY INDUSTRIES, LTD., Tokyo (JP); MITSUBISHI ELECTRIC CORPORATION, Tokyo (JP)

( * ) Notice: Subject to any disclaimer, the term of this patent is extended or adjusted under 35 U.S.C. 154(b) by 502 days.

(21) Appl. No.: 13/296,313

(22) Filed: Nov. 15, 2011

(65) Prior Publication Data

US 2012/0148005 A1 Jun. 14, 2012

(30) Foreign Application Priority Data

Dec. 9, 2010 (JP) ................................. 2010-275120

(51) Int. Cl.
*G21C 9/02* (2006.01)
*G21C 9/027* (2006.01)
(Continued)

(52) U.S. Cl.
CPC .............. *G21C 9/02* (2013.01); *G21C 9/027* (2013.01); *G21D 3/06* (2013.01); *G21C 7/08* (2013.01); *G21C 7/12* (2013.01); *Y02E 30/40* (2013.01)

(58) Field of Classification Search
CPC ... G21C 7/08; G21C 7/12; G21C 7/09; G21C 9/00; G21C 9/02; Y02E 30/40
(Continued)

(56) References Cited

U.S. PATENT DOCUMENTS 2,931,763 A * 4/1960 Dever ..................... G01T 1/185
376/215
4,282,061 A * 8/1981 Sakurai .................... G21C 7/36
376/236
(Continued)

FOREIGN PATENT DOCUMENTS

EP 0781451 A1 7/1997
JP 50-153400 6/1974
(Continued)

OTHER PUBLICATIONS

Office Action dated Aug. 26, 2014, issued in corresponding Japan Application No. 2010-275120, with English Translation.
(Continued)

*Primary Examiner* — Jack W Keith
*Assistant Examiner* — Lily C Garner
(74) *Attorney, Agent, or Firm* — Westerman, Hattori, Daniels & Adrian, LLP

(57) ABSTRACT

A reactor shutdown system includes a reactor, a control-rod drive unit that can drive a control rod in pulling and inserting directions with respect to a fuel assembly, a power source that can supply power to the control-rod drive unit, and a power converter that is provided between the control-rod drive unit and the power source, in which when power supply is cut off, the control-rod drive unit inserts the control rod into the fuel assembly to stop nuclear reaction in the reactor, and the reactor shutdown system includes a reactor trip breaker provided between the power converter and the control-rod drive unit, a safety protection-system device that controls the reactor trip breaker to cut off power supply to the control-rod drive unit, and a CCF device that controls the power converter to cut off power supply to the control-rod drive unit.

2 Claims, 2 Drawing Sheets

(51) Int. Cl.
*G21D 3/06* (2006.01)
*G21C 7/08* (2006.01)
*G21C 7/12* (2006.01)

(58) Field of Classification Search
USPC .............. 376/215, 216, 217, 259, 245, 282; 176/20 R, 22, 24
See application file for complete search history.

(56) References Cited

U.S. PATENT DOCUMENTS

| | | | | |
|---|---|---|---|---|
| 4,434,132 | A * | 2/1984 | Cook | G21D 3/06 376/215 |
| 4,843,537 | A * | 6/1989 | Arita et al. | 700/82 |
| 5,196,158 | A | 3/1993 | Partington | |
| 5,881,115 | A * | 3/1999 | Lipner | G06F 9/44 376/216 |
| 6,484,126 | B1 * | 11/2002 | Brown et al. | 702/184 |
| 6,516,041 | B1 * | 2/2003 | Curreri | 376/217 |
| 2003/0112917 | A1 * | 6/2003 | Droege | 376/282 |
| 2005/0281368 | A1 * | 12/2005 | Droba et al. | 376/260 |

FOREIGN PATENT DOCUMENTS

| | | | | |
|---|---|---|---|---|
| JP | 56-40797 | A | 4/1981 | |
| JP | 1-206289 | A | 8/1989 | |
| JP | 3-012595 | A | 1/1991 | |
| JP | 05-333195 | | * 12/1993 | .............. G21D 3/04 |
| JP | 6-207998 | A | 7/1994 | |
| JP | 7-49399 | A | 2/1995 | |
| WO | 97/04463 | A1 | 2/1997 | |

OTHER PUBLICATIONS

Extended European Search Report dated Oct. 30, 2014, issued in corresponding European Application No. 11192098.9. (7 pages).
Decision of a Patent Grant dated Jan. 20, 2015, issued in corresponding Japanese Patent Application No. 2010-275120, with English translation (3 pages).
Official Communication under Rule 71(3) EPC (Intention to Grant), dated Oct. 27, 2015, issued in counterpart European Patent Application No. 11192098.9. (35 pages).

* cited by examiner

REACTOR SHUTDOWN SYSTEM

FIELD

The present invention relates to a reactor shutdown system that shuts down a reactor in an event of a malfunction in a nuclear facility having a reactor.

BACKGROUND

Conventionally, as a reactor shutdown system related to the present invention, for example, a reactor shutdown system placed outside a central control room described in Patent Literature 1 has been known. The reactor shutdown system placed outside a central control room has an auxiliary machine for safely shutting down the reactor.

CITATION LIST

Patent Literature

Patent Literature 1: Japanese Patent Application Laid-open No. H03-12595

SUMMARY

Technical Problem

Generally, a reactor trip breaker that shuts down a reactor is used as the auxiliary machine for safely shutting down the reactor. The reactor trip breaker is configured so that it can interrupt power supplied to a control-rod drive unit that drives a control rod to be inserted into a reactor core of the reactor. When power supply is cut off, the control-rod drive unit inserts the control rod into the reactor core, thereby shuts down the reactor. Accordingly, in the event of a malfunction, the reactor shutdown system shuts down the reactor by interrupting the power supplied to the control-rod drive unit with the reactor trip breaker.

At that time, the reactor trip breaker is controlled by a safety protection-system device for safely shutting down the reactor. When the safety protection-system device is configured by a digital device, it may be difficult for the safety protection-system device to activate the reactor trip breaker in the event of a malfunction if trouble such as a common cause failure occurs in the safety protection-system device.

Therefore, an object of the present invention is to provide a reactor shutdown system that can shut down the reactor by various means in an event of a malfunction in the nuclear facility.

Solution to Problem

According to an aspect of the present invention, a reactor shutdown system that stops nuclear reaction in a reactor in an event of a malfunction in a nuclear facility including a reactor that can accommodate therein a control rod pulled out from or inserted into a fuel assembly, a ontrol-rod drive unit that can drive the control rod in pulling and inserting directions, a power source that can supply power to the control-rod drive unit, and a power converter that is provided between the control-rod drive unit and the power source and can convert power supplied from the power source to supply the power to the control-rod drive unit. When power supply is cut off, the control-rod drive unit inserts the control rod into the fuel assembly to stop the nuclear reaction in the reactor. The reactor shutdown system comprises: a breaker that is interposed between the power converter and the control-rod drive unit and can interrupt the power supplied from the power converter to the control-rod drive unit; a main stop-control device that controls the breaker to cut off the power supply to the control-rod drive unit in the event of a malfunction in the nuclear facility; and an auxiliary stop-control device that controls the power converter to cut off the power supply to the control-rod drive unit in the event of a malfunction in the nuclear facility.

According to this configuration, when trouble occurs in the main stop-control device due to trouble such as a common cause failure and there is a malfunction in the nuclear facility, it may be difficult for the main stop-control device to control the breaker to cut off power supply to the control-rod drive unit. In this case, the auxiliary stop-control device can control the power converter instead of the main stop-control device to cut off power supply to the control-rod drive unit. Accordingly, even if it is difficult to interrupt power by the breaker due to trouble in the main stop-control device, power can be interrupted by the power converter rather than the breaker, and thus the reactor can be properly shut down by various means.

Advantageously, in the reactor shutdown system, the power converter includes a power storage unit that stores the power supplied from the power source, and the power storage unit supplies the power at least to the breaker and the main stop-control device, after cutoff of the power supply.

According to this configuration, even after power is interrupted by the power converter, the power accumulating unit in the power converter can supply power to the control-rod drive unit via the breaker.

Advantageously, the reactor shutdown system further includes a detection sensor connected to the main stop-control device to detect an operating condition of the nuclear facility. The main stop-control device receives the detection signal issued from the detection sensor and transmits the received detection signal to the auxiliary stop-control device.

According to this configuration, the same detection signal can be used as a detection signal to be input to the main stop-control device and as a detection signal to be input to the auxiliary stop-control device. Therefore, the main stop-control device and the auxiliary stop-control device can determine whether to shut down the reactor based on the same detection signal. Accordingly, shutdown determination of the reactor can be performed doubly, thereby enabling to determine whether to shut down the reactor accurately.

Advantageously, the reactor shutdown system, when having determined to stop the nuclear reaction in the reactor based on the received detection signal, the main stop-control device transmits a first reactor-shutdown signal to the breaker, when having determined to stop the nuclear reaction in the reactor based on the received detection signal, the auxiliary stop-control device transmits a second reactor-shutdown signal to the power converter, upon reception of the first reactor-shutdown signal, the breaker cuts off the power supply to the control-rod drive unit and transmits a block signal to the auxiliary stop-control device, and the auxiliary stop-control device includes a block circuit that blocks the second reactor-shutdown signal transmitted to the power converter, based on the received block signal.

According to this configuration, when power is interrupted by the main stop-control device via the breaker, the auxiliary stop-control device receives the block signal, and therefore performs no power interruption via the power converter. Accordingly, when the main stop-control device operates normally, the auxiliary stop-control device does not cut off power supply to the control-rod drive unit by controlling the power converter.

Advantageously, in the reactor shutdown system, the auxiliary stop-control device includes a delay circuit that delays time for transmitting the second reactor-shutdown signal to the power converter by an amount of delay time since reception of the detection signal by the main stop-control device until transmission of the block signal from the breaker to the auxiliary stop-control device.

According to this configuration, the second reactor-shutdown signal is not transmitted from the auxiliary stop-control device to the power converter by the amount of delay time until the block signal is transmitted from the breaker to the auxiliary stop-control device, due to the delay circuit. Therefore, when having determined to shut down the reactor, the main stop-control device can block the second reactor-shutdown signal transmitted from the auxiliary stop-control device and transmit the first reactor-shutdown signal. Further, when the main stop-control device determines not to shut down the reactor due to trouble caused in the main stop-control device while the auxiliary stop-control device determines to shut down the reactor, the auxiliary stop-control device can transmit the second reactor-shutdown signal to the power converter.

Advantageous Effects Of Invention

According to the reactor shutdown system of the present invention, even if trouble occurs in the main stop-control device, the reactor can be shut down by the auxiliary stop-control device rather than the main stop-control device. Accordingly, the reactor can be properly shut down by various means.

DESCRIPTION OF EMBODIMENTS

Figure 1:
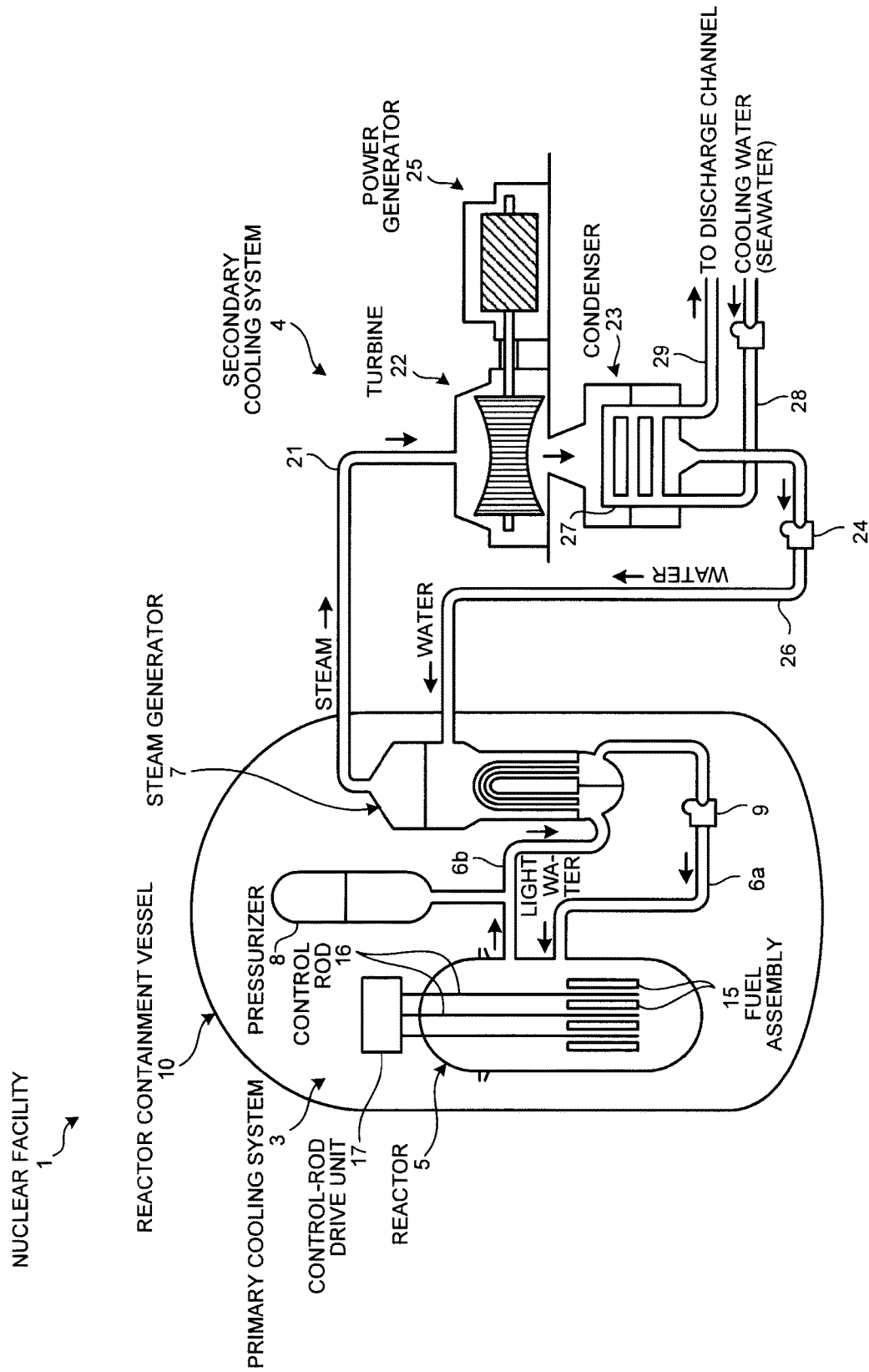
FIG. 1 is a schematic configuration diagram schematically depicting a nuclear facility including a reactor shutdown system according to an embodiment of the present invention.

Exemplary embodiments of a reactor shutdown system according to the present invention will be explained below in detail with reference to the accompanying drawings. The present invention is not limited to the embodiments. In addition, constituent elements in the following embodiments include those that can be easily replaced by persons skilled in the art or those that are substantially equivalent.
Embodiment
FIG. 1 is a schematic configuration diagram schematically depicting a nuclear facility including a reactor shutdown system according to an embodiment of the present invention. A reactor shutdown system 47 (see FIG. 2) according to the present invention is for shutting down a reactor 5. As the reactor 5, a pressurized water reactor (PWR) is used, for example. A nuclear facility 1 using the pressurized water reactor 5 includes a primary cooling system 3 including the reactor 5, and a secondary cooling system 4 that performs heat exchange with the primary cooling system 3. A primary coolant circulates in the primary cooling system 3 and a secondary coolant circulates in the secondary cooling system 4.

The primary cooling system 3 includes the reactor 5, and a steam generator 7 connected to the reactor 5 via coolant pipes 6a and 6b including a cold leg 6a and a hot leg 6b. Further, a pressurizer 8 is interposed in the hot leg 6b, and a coolant pump 9 is interposed in the cold leg 6a. The reactor 5, the coolant pipes 6a and 6b, the steam generator 7, the pressurizer 8, and the coolant pump 9 are accommodated in a reactor containment vessel 10.

The reactor 5 is the pressurized water reactor as described above, and inside thereof is filled with the primary coolant. In the reactor 5, many fuel assemblies 15 are accommodated, and many control rods 16 that control nuclear fission of the fuel assemblies 15 are provided therein in such a manner that the control rods 16 can be pulled out from and inserted into the fuel assemblies 15. The control rods 16 are driven in pulling and inserting directions with respect to the fuel assemblies 15 by a control-rod drive unit 17. When the control rods 16 are inserted into the fuel assemblies 15 by the control-rod drive unit 17, nuclear reaction in the fuel assemblies 15 decreases and stops. On the other hand, when the control rods 16 are pulled out by the control-rod drive unit 17, the nuclear reaction in the fuel assemblies 15 is enhanced to become a critical state. The control-rod drive unit 17 is configured to insert the control rods 16 into the fuel assemblies 15 when power supply is cut off and the control-rod drive unit 17 becomes a power loss state.

When the fuel assemblies 15 are caused to fission while the fission reaction is controlled by the control rods 16, thermal energy is generated by the nuclear fission. The generated thermal energy heats the primary coolant, and the heated primary coolant is fed to the steam generator 7 via the hot leg 6b. On the other hand, the primary coolant fed from the steam generator 7 via the cold leg 6a flows into the reactor 5 to cool the inside of the reactor 5.

The pressurizer 8 interposed in the hot leg 6b pressurizes the high-temperature primary coolant to suppress boiling of the primary coolant. Further, the steam generator 7 causes heat exchange between the high-temperature and high-pressure primary coolant and the secondary coolant to generate heat by evaporation of the secondary coolant and cool the high-temperature and high-pressure primary coolant. Each coolant pump 9 circulates the primary coolant in the primary cooling system 3, such that the primary coolant is fed from each steam generator 7 to the reactor 5 via the cold leg 6a and is also fed from the reactor 5 to each steam generator 7 via the hot leg 6b.

A series of operation in the primary cooling system 3 of the nuclear facility 1 is explained here. When the primary coolant is heated by the thermal energy generated by the fission reaction in the reactor 5, the heated primary coolant is fed to each steam generator 7 via the hot leg 6b by each coolant pump 9. The high-temperature primary coolant passing through the hot leg 6b is pressurized by the pressurizer 8 so that boiling thereof is suppressed, and flows into each steam generator 7 in a high-temperature and high-pressure state. The high-temperature and high-pressure primary coolant flowing into each steam generator 7 is cooled by heat exchange with the secondary coolant, and the cooled primary coolant is fed to the reactor 5 via the cold leg 6a by each coolant pump 9. The reactor 5 is cooled by the cooled primary coolant flowing into the reactor 5. That is, the primary coolant is circulating between the reactor 5 and the steam generator 7. The primary coolant is light water used as the coolant and a neutron moderator.

The secondary cooling system 4 includes a turbine 22 connected to each steam generator 7 via a steam pipe 21, a condenser 23 connected to the turbine 22, and a feed pump 24 interposed in a feed pipe 26 connecting the condenser 23 and each steam generator 7. A power generator 25 is connected to the turbine 22.

A series of operation in the secondary cooling system 4 of the nuclear facility 1 is explained here. When steam flows into the turbine 22 from each steam generator 7 via the steam pipe 21, the turbine 22 rotates. When the turbine 22 rotates, the power generator 25 connected to the turbine 22 generates power. Thereafter, steam flowing out from the turbine 22 flows into the condenser 23. The condenser 23 includes a cooling pipe 27 provided therein, an intake pipe 28 for supplying cooling water (for example, seawater) is connected to one end of the cooling pipe 27, and an exhaust pipe 29 for discharging the cooling water is connected to the other end of the cooling pipe 27. The condenser 23 returns the steam to liquid by cooling the steam flowing in from the turbine 22 with the cooling pipe 27. The secondary coolant, which becomes the liquid, is fed to each steam generator 7 via the feed pipe 26 by the feed pump 24. The secondary coolant fed to each steam generator 7 undergoes heat exchange with the primary coolant in each steam generator 7 to become steam again.

Figure 2:
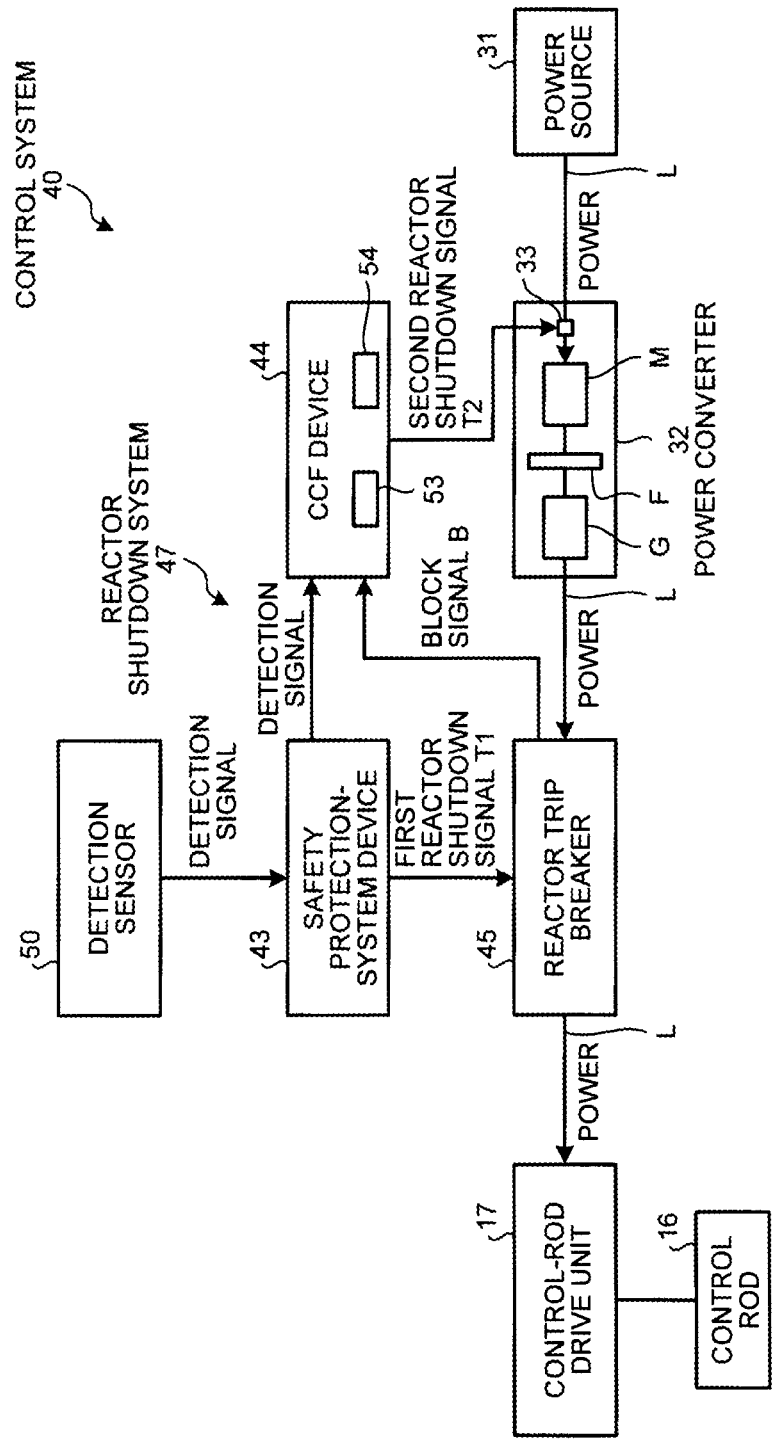
FIG. 2 is a configuration diagram of peripherals of the reactor shutdown system according to the present embodiment.

FIG. 2 is a configuration diagram of peripherals of the reactor shutdown system according to the present embodiment. As shown in FIG. 2, the nuclear facility 1 includes a power source 31 for supplying power to the nuclear facility 1, and a power converter 32 that converts the power supplied from the power source 31. The power converter 32 is a so-called MG set with flywheel, and supplies power to the control-rod drive unit 17 and various devices such as a reactor trip breaker 45 described later. The power converter 32 includes a motor M, a power generator G, and a flywheel F arranged between the motor M and the power generator G. The motor M is connected to the power source 31, so that field current is generated by the power supplied from the power source 31, thereby enabling to rotate the motor M. The power generator G is connected to the motor M via the flywheel F, and generates power when the motor M rotates. The flywheel F functions as a power storage unit, and can store power by rotating the flywheel F by the motor M. Further, the power converter 32 has a breaker circuit 33 that interrupts the power supplied from the power source 31, and is connected to a CCF device 44 described later.

Therefore, when power is supplied from the power source 31, the supplied power is fed to the power converter 32. The power converter 32 stores power by rotating the flywheel F using a part of the supplied power, and rotates the motor M using the rest of the supplied power, thereby performing power generation by the power generator G. Meanwhile, the power converter 32 can generate power temporarily even if the breaker circuit 33 interrupts the power supplied from the power source 31 and the power converter 32 becomes the power loss state because the flywheel F is rotating. In the power converter 32 according to the present embodiment, the flywheel F is used as the power storage unit; however, the present invention is not limited thereto, and a fluid coupling arranged between the motor M and the power generator G can be used as the power storage unit, for example.

In the nuclear facility 1 configured in this manner, a control system 40 that controls actuation of the above-described reactor 5, and various devices such as the pumps and valves (not shown) is arranged. The control system 40 includes a central control system (not shown), a plant control system (not shown), a safety protection-system device (main stop-control device) 43, and a CCF device (auxiliary stop-control device) 44.

In the central control system, although not shown, a display device that displays an operating condition of the nuclear facility 1, an operating device that operates the nuclear facility 1, and the like are provided. An operator who operates the nuclear facility 1 obtains the operating condition of the nuclear facility 1 by viewing the display device and appropriately manipulates the operating device, thereby operating the nuclear facility 1. The plant control system controls the operations of the reactor 5 and the various devices of the nuclear facility 1 based on an operation signal output from the operating device in the central control system.

As shown in FIG. 2, the safety protection-system device 43 controls various devices provided in the nuclear facility 1 so that the nuclear facility 1 is safely shut down in an event of a malfunction in the nuclear facility 1. The CCF device 44 is a backup device that assists the safety protection-system device 43, and when there is trouble or the like in the safety protection-system device 43, the CCF device 44 controls the various devices provided in the nuclear facility 1 so that the nuclear facility 1 is safely shut down.

The control system 40 in the nuclear facility 1 includes a reactor shutdown system 47 that brings the nuclear reaction in the reactor 5 to an emergency stop, assuming an event of a malfunction in the reactor 5. The reactor shutdown system 47 includes the safety protection-system device 43, the CCF device 44, and the reactor trip breaker 45 provided in a power supply line L connecting the power converter 32 and the control-rod drive unit 17 to each other.

The safety protection-system device 43 is a so-called digital device mounted with an arithmetic unit such as a CPU and a storage unit such as an HDD. The safety protection-system device 43 can control a safety protection system in the nuclear facility 1 by executing various programs stored in the storage unit by the arithmetic unit. The safety protection system is a functional system having functions of stopping the nuclear reaction in the reactor 5, cooling the nuclear facility 1, and preventing leakage of radioactive substances from the nuclear facility 1. The safety protection-system device 43 highly ensures the operation so that it can operate reliably and even under severe environments.

The safety protection-system device 43 is connected to various detection sensors 50 arranged in the nuclear facility 1 and determines whether there is a malfunction in the nuclear facility 1 based on detection signals output from the various detection sensors 50. When having determined that there is a malfunction in the nuclear facility 1, the safety protection-system device 43 transmits a first reactor shutdown signal T1 for shutting down the reactor 5 to the reactor trip breaker 45.

The CCF device 44 is provided assuming that trouble such as a common cause failure occurs in the safety protection-system device 43. The CCF device 44 is an analog device and is configured by using electric circuit parts such as a switch and a relay and connecting respective contact points with an electric wire. The common cause failure means a failure due to a common cause, and particularly means that hardware such as the arithmetic unit used in the digital device fails to operate properly due to a common cause or that software is not executed due to a common cause such as a bug.

The CCF device 44 receives the detection signals input from the various detection sensors 50 via the safety protection-system device 43, and determines whether a malfunction has occurred in the nuclear facility 1 based on these detection signals. When having determined that a malfunction has occurred in the nuclear facility 1, the CCF device 44 transmits a second reactor shutdown signal T2 for shutting down the reactor 5 to the power converter 32.

The CCF device 44 also includes a delay circuit 53 and a block circuit 54. The block circuit 54 blocks the second reactor shutdown signal T2 transmitted from the CCF device 44 to the power converter 32, based on an input block signal B. The delay circuit 53 delays transmission of the second reactor shutdown signal T2 transmitted from the CCF device 44 to the power converter 32, by an amount of delay time since input of the detection signals to the safety protection-system device 43 until input of the block signal B to the block circuit 54.

The reactor trip breaker 45 interrupts the power supplied from the power converter 32 to the control-rod drive unit 17 based on the first reactor shutdown signal T1 transmitted from the safety protection-system device 43. Further, upon reception of the first reactor shutdown signal T1 from the safety protection-system device 43, the reactor trip breaker 45 transmits a block signal B to the CCF device 44 for blocking the second reactor shutdown signal T2 transmitted from the CCF device 44. Consequently, the block circuit 54 in the CCF device 44 blocks transmission of the second reactor shutdown signal T2 from the CCF device 44 when the block signal B is input from the reactor trip breaker 45.

Subsequently, a series of operation for shutting down the reactor 5 by the reactor shutdown system 47 is explained. It is explained for a case that trouble such as a common cause failure has occurred in the safety protection-system device 43 and for a case that no trouble has occurred in the safety protection-system device 43. First, the latter case is explained. In the reactor shutdown system 47, when the detection signals are input from the various detection sensors 50 to the safety protection-system device 43, the safety protection-system device 43 transmits the input detection signals to the CCF device 44 and determines whether to shut down the reactor 5 based on the input detection signals.

When having determined to shut down the reactor 5, the safety protection-system device 43 transmits the first reactor shutdown signal T1 to the reactor trip breaker 45. Upon reception of the first reactor shutdown signal T1, the reactor trip breaker 45 cuts off the power supply line L from the power converter 32 to the control-rod drive unit 17. Further, upon reception of the first reactor shutdown signal T1, the reactor trip breaker 45 transmits a block signal B to the CCF device 44.

When the power supply line L is cut off by the reactor trip breaker 45, power supply to the control-rod drive unit 17 is cut off. Then, the control-rod drive unit 17 becomes the power loss state, and thus the control rods 16 are inserted into the fuel assemblies 15, thereby stopping the nuclear reaction in the reactor 5.

On the other hand, the CCF device 44 determines whether to shut down the reactor 5 based on the detection signals input from the safety protection-system device 43. When having determined to shut down the reactor 5, the CCF device 44 tries to transmit the second reactor shutdown signal T2 to the breaker circuit 33 in the power converter 32. However, the delay circuit 53 delays the transmission of the second reactor shutdown signal T2 by the amount of delay time. When the block signal B is input from the reactor trip breaker 45 to the CCF device 44 thereafter, the block circuit 54 blocks the transmission of the second reactor shutdown signal T2. Consequently, the second reactor shutdown signal T2 is not transmitted to the power converter 32.

Accordingly, when there is no common cause failure in the safety protection-system device 43, the reactor shutdown system 47 can shut down the reactor 5 by the reactor trip beaker 45 cutting off the power supply line L, based on the first reactor shutdown signal T1 transmitted from the safety protection-system device 43. On the other hand, because the block signal B is transmitted from the reactor trip breaker 45 to the CCF device 44, the power converter 32 does not cut off the power supply line L with the breaker circuit 33.

The case that trouble such as the common cause failure has occurred in the safety protection-system device 43 is explained next. In the reactor shutdown system 47, when the detection signals are input from the various detection sensors 50 to the safety protection-system device 43, the safety protection-system device 43 transmits the input detection signals to the CCF device 44 and determines whether to shut down the reactor 5 based on the input detection signals.

At that time, because the trouble has occurred, the safety protection-system device 43 has a difficulty to properly perform determination whether to shut down the reactor 5. Therefore, even if the reactor 5 needs to be shut down, the safety protection-system device 43 may not transmit the first reactor shutdown signal T1 to the reactor trip breaker 45. On the other hand, the CCF device 44 having received the detection signals determines whether to shut down the reactor 5 based on the input detection signals.

If the safety protection-system device 43 does not transmit the first reactor shutdown signal T1 to the reactor trip breaker 45, the first reactor shutdown signal T1 is not input to the reactor trip breaker 45. Therefore, the power supply line L from the power converter 32 to the control-rod drive unit 17 is not cut off. Further, the reactor trip breaker 45 does not transmit the block signal B to the CCF device 44.

On the other hand, when having determined to shut down the reactor 5, the CCF device 44 tries to transmit a second reactor shutdown signal T2 to the breaker circuit 33 in the power converter 32. At that time, the delay circuit 53 delays the transmission of the second reactor shutdown signal T2 by the amount of delay time. When the block signal B is not input to the block circuit 54 thereafter, the CCF device 44 transmits the second reactor shutdown signal T2 to the power converter 32. Upon reception of the second reactor shutdown signal T2, the power converter 32 interrupts the power flowing from the power source 31 to the motor M with the breaker circuit 33 to interrupt the field current in the motor M. When the field current in the motor M is interrupted, rotation of the motor M stops. However, the flywheel F continuously rotates. Accordingly, in the power converter 32, even after the motor M has stopped, power generation by the power generator G is temporarily performed to supply power to the control-rod drive unit 17, the reactor trip breaker 45, and the safety protection-system device 43.

After interruption of the power by the breaker circuit 33 in the power converter 32, when the power supply to the control-rod drive unit 17 is cut off, the control-rod drive unit 17 becomes the power loss state. Therefore, the control-rod drive unit 17 stops the nuclear reaction in the reactor 5 by inserting the control rods 16 into the fuel assemblies 15.

In this way, even if trouble occurs in the safety protection-system device 43, the reactor shutdown system 47 can shut down the reactor 5 by interrupting power in the power converter 32 with the CCF device 44. On the other hand, because the first reactor shutdown signal T1 is not transmitted from the safety protection-system device 43 to the reactor trip breaker 45, the reactor trip breaker 45 does not cut off the power supply line L.

According to the above configuration, even if power interruption by the reactor trip breaker 45 is difficult due to trouble such as the common cause failure in the safety protection-system device 43, the CCF device 44 in the reactor shutdown system 47 operates to cut off the power supply line L with the power converter 32 rather than the reactor trip breaker 45, to cut off power supply to the control-rod drive unit 17. Consequently, even if there is trouble in the safety protection-system device 43, the reactor shutdown system 47 can cut off power supply to the control-rod drive unit 17 by various means, thereby enabling to properly stop the nuclear reaction in the reactor 5.

Because the power converter 32 includes the flywheel F, the power converter 32 can supply power to the control-rod drive unit 17 and the reactor trip breaker 45 temporarily even if the power converter 32 is in the power loss state. Therefore, even after power interruption is executed by the CCF device 44, the reactor trip breaker 45 can be maintained so as to be able to execute power interruption.

In the reactor shutdown system 47, after the detection signals transmitted from the various detection sensors 50 are received by the safety protection-system device 43, these detection signals can be transmitted from the safety protection-system device 43 to the CCF device 44. Consequently, the safety protection-system device 43 and the CCF device 44 can determine whether to shut down the reactor 5 based on the same detection signals. Therefore, the shutdown determination of the reactor 5 can be performed doubly, thereby enabling to perform shutdown determination of the reactor 5 accurately.

The reactor trip breaker 45 can transmit the block signal B for blocking the second reactor shutdown signal T2 transmitted from the CCF device 44 to the power converter 32, to the CCF device 44. Consequently, in the reactor shutdown system 47, when the safety protection-system device 43 normally operates, the safety protection-system device 43 interrupts power via the reactor trip breaker 45, whereas the CCF device 44 performs no power interruption via the power converter 32.

Because the CCF device 44 includes the delay circuit 53, the delay circuit 53 can delay the second reactor shutdown signal T2 by the amount of delay time until the reactor trip breaker 45 transmits the block signal B to the CCF device 44. Consequently, when the safety protection-system device 43 determines to shut down the reactor 5, the reactor shutdown system 47 can transmit the first reactor shutdown signal T1 by blocking the second reactor shutdown signal T2 transmitted from the CCF device 44.

INDUSTRIAL APPLICABILITY

As described above, the reactor shutdown system according to the present invention is useful when a device for shutting down a reactor is configured by a digital device and an analog device, and is particularly suitable when the reactor is shut down without using a reactor trip breaker.

REFERENCE SIGNS LIST

1 nuclear facility
3 primary cooling system
4 secondary cooling system
5 reactor
7 steam generator
8 pressurizer
15 fuel assembly
16 control rod
17 control-rod drive unit
22 turbine
25 power generator
31 power source
32 power converter
33 breaker circuit
40 control system
43 safety protection-system device
44 CCF device
45 reactor trip breaker
47 reactor shutdown system
50 detection sensor
53 delay circuit
54 block circuit
M motor
G power generator
F flywheel
L power supply line
T1 first reactor shutdown signal
T2 second reactor shutdown signal
B block signal

The invention claimed is:

1. A reactor shutdown system that stops nuclear reaction in a reactor in an event of a malfunction in a nuclear facility including
a reactor that accommodates therein a control rod pulled out from or inserted into a fuel assembly,
a control-rod drive unit that drives the control rod in pulling and inserting directions,
a power source that supplies power to the control-rod drive unit, and
a power converter that is provided between the control-rod drive unit and the power source and that converts power supplied from the power source to supply the power to the control-rod drive unit, wherein
when power supply is cut off, the control-rod drive unit inserts the control rod into the fuel assembly to stop the nuclear reaction in the reactor,
comprising:
a breaker that is interposed between the power converter and the control-rod drive unit and that is configured to shut the power supplied from the power converter to the control-rod drive unit;
a main stop-control device that is configured to control the breaker to cut off the power supply to the control-rod drive unit in the event of a malfunction in the nuclear facility, the main stop-control device being a digital device including a storage unit and an arithmetic unit configured to execute various programs stored in the storage unit for safety protection of the nuclear facility;
an auxiliary stop-control device that is configured to control the power converter to cut off the power supply to the control-rod drive unit in the event of a malfunction in the nuclear facility, the auxiliary stop-control device being an analog device and being configured by using electric circuit parts such as a switch and a relay and connecting respective contact points with an electric wire; and
a detection sensor connected to the main stop-control device and configured to detect an operating condition of the nuclear facility, wherein
the main stop-control device is configured to receive the detection signal issued from the detection sensor and configured to transmit the received detection signal to the auxiliary stop-control device, when having determined to stop the nuclear reaction in the reactor based on the received detection signal, the main stop-control device is configured to transmit a first reactor-shutdown signal to the breaker, when having determined to stop the nuclear reaction in the reactor based on the received detection signal, the auxiliary stop-control device is configured to transmit a second reactor-shutdown signal to the power converter, upon reception of the first reactor-shutdown signal, the breaker is configured to cut off the power supply to the control-rod drive unit and configured to transmit a block signal to the auxiliary stop-control device, and the auxiliary stop-control device includes a block circuit that is configured to block the second reactor-shutdown signal transmitted to the power converter, based on the received block signal, wherein the block circuit is configured to block the second reactor-shutdown signal from the auxiliary stop-control device when the main stop-control device is operated normally, and the auxiliary stop-control device is configured to operate only when the main stop-control device is not functioning normally due to a failure.

2. The reactor shutdown system according to claim 1, wherein the auxiliary stop-control device includes a delay circuit that delays time for transmitting the second reactor-shutdown signal to the power converter by an amount of delay time since reception of the detection signal by the main stop-control device until transmission of the block signal from the breaker to the auxiliary stop-control device.

* * * * *